United States Patent
Poiesz et al.

(10) Patent No.: US 9,836,596 B2
(45) Date of Patent: Dec. 5, 2017

(54) METHODS AND SYSTEMS FOR CONTROLLING PERMISSION REQUESTS FOR APPLICATIONS ON A COMPUTING DEVICE

(71) Applicant: Google Inc., Mountain View, CA (US)

(72) Inventors: Benjamin D. Poiesz, Santa Clara, CA (US); Andrew Abramson, Sunnyvale, CA (US); Roger William Graves, San Francisco, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 14/794,170

(22) Filed: Jul. 8, 2015

(65) Prior Publication Data
US 2017/0011215 A1    Jan. 12, 2017

(51) Int. Cl.
*G06F 21/00* (2013.01)
*G06F 21/52* (2013.01)
*G06F 9/46* (2006.01)
*G06F 21/62* (2013.01)

(52) U.S. Cl.
CPC .............. *G06F 21/52* (2013.01); *G06F 9/468* (2013.01); *G06F 21/6209* (2013.01); *G06F 2221/033* (2013.01)

(58) Field of Classification Search
CPC ..... G06F 21/52; G06F 9/468; G06F 2221/033
See application file for complete search history.

(56) References Cited

U.S. PATENT DOCUMENTS

| | | | |
|---|---|---|---|
| 2011/0055892 | A1 | 3/2011 | Wang et al. |
| 2012/0209923 | A1* | 8/2012 | Mathur .................. G06F 21/53 709/206 |
| 2013/0097203 | A1 | 4/2013 | Bhattacharjee et al. |

(Continued)

FOREIGN PATENT DOCUMENTS

CN         104125335 A    10/2014

OTHER PUBLICATIONS

International Searching Authority, International Search Report and Written Opinion for PCT/US2016/039830, dated Sep. 29, 2016.
(Continued)

*Primary Examiner* — Mahfuzur Rahman
(74) *Attorney, Agent, or Firm* — McDonnell Boehnen Hulbert & Berghoff LLP

(57) ABSTRACT

Examples described may relate to methods and systems for controlling permission requests for applications running on a computing device to access resources provided by the computing device. A computing device may maintain in memory for a given application responses to permission requests. The computing device may receive responses to a first permission request that includes two selectable options to either allow or deny access to a particular resource. The computing device may determine whether a number of the responses to the first request that indicate to deny access exceeds a predefined threshold. If the number exceeds the threshold, the computing device may provide, at a run-time of the application subsequent to presentation of the first request, and based on the application attempting to access the resource, a modified permission request that includes, in addition to the two selectable options, a selectable option to prevent requesting permission to access the resource.

22 Claims, 7 Drawing Sheets

(56) References Cited

U.S. PATENT DOCUMENTS

2013/0145427 A1     6/2013  Howard et al.
2015/0373024 A1*   12/2015  Zhang .................. H04L 63/101
                                                        726/4
2016/0191534 A1*    6/2016  Mallozzi ............. G06F 21/6218
                                                        726/4

OTHER PUBLICATIONS

Birch, "Exploring the new Android Permissions Model", Jul. 15, 2015.
Android M—check runtime permission—how to determine if the user checked "Never ask again"?, Jun. 8, 2015.

* cited by examiner

METHODS AND SYSTEMS FOR CONTROLLING PERMISSION REQUESTS FOR APPLICATIONS ON A COMPUTING DEVICE

BACKGROUND

Unless otherwise indicated herein, the materials described in this section are not prior art to the claims in this application and are not admitted to be prior art by inclusion in this section.

Applications configured to run on modern computing devices such as smartphones, tablets, laptops, and the like, may request permission to access various resources provided by the computing devices. For example, a map application may, during installation, request access to a location of the computing device. As a further example, a social media application may request access to a camera component of the computing device and/or to existing photos stored in memory of the computing device. In these cases and in others, the user of the computing device may select whether to grant or deny the application access to a particular resource.

SUMMARY

Example embodiments may relate to methods and systems involving control of permission requests for applications configured to run on a computing device. An example method involves receiving, by at least one processor of a computing device, data indicative of responses to a first permission request for an application running on the computing device to access a particular resource provided by the computing device, where the first permission request includes selectable options other than a selectable option to prevent the application requesting permission to access the particular resource, the selectable options including a selectable option to allow access to the particular resource and a selectable option to deny access to the particular resource. The example method also involves the at least one processor making a determination of whether a number of the responses to the first permission request that indicate to deny access exceeds a predefined threshold. The example method further involves based on the determination being that the number of the responses to the first permission request that indicate to deny access exceeds the predefined threshold, the at least one processor providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource.

In other examples, described herein is a computing device that comprises one or more processors and a computer-readable medium having stored thereon program instructions that when executed by the one or more processors cause the computing device to perform operations. The operations include receiving data indicative of responses to a first permission request for an application running on the computing device to access a particular resource provided by the computing device, where the first permission request includes selectable options other than a selectable option to prevent the application requesting permission to access the particular resource, the selectable options including a selectable option to allow access to the particular resource and a selectable option to deny access to the particular resource. The operations may also include making a determination of whether a number of the responses to the first permission request that indicate to deny access exceeds a predefined threshold. The operations may further include based on the determination being that the number of the responses to the first permission request that indicate to deny access exceeds the predefined threshold, providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource.

In still other examples, a computer-readable medium having stored thereon program instructions that when executed by a computing device that includes at least one processor cause the computing device to perform operations is described. The operations may include receiving data indicative of responses to a first permission request for an application running on the computing device to access a particular resource provided by the computing device, where the first permission request includes selectable options other than a selectable option to prevent the application requesting permission to access the particular resource, the selectable options including a selectable option to allow access to the particular resource and a selectable option to deny access to the particular resource. The operations may also include making a determination of whether a number of the responses to the first permission request that indicate to deny access exceeds a predefined threshold. The operations may further include based on the determination being that the number of the responses to the first permission request that indicate to deny access exceeds the predefined threshold, providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource.

In yet still other examples, a system is described that includes a means for receiving data indicative of responses to a first permission request for an application running on the computing device to access a particular resource provided by the computing device, where the first permission request includes selectable options other than a selectable option to prevent the application requesting permission to access the particular resource, the selectable options including a selectable option to allow access to the particular resource and a selectable option to deny access to the particular resource. The system may also include a means for making a determination of whether a number of the responses to the first permission request that indicate to deny access exceeds a predefined threshold. The system may further include a means for, based on the determination being that the number of the responses to the first permission request that indicate to deny access exceeds the predefined threshold, providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource.

These as well as other aspects, advantages, and alternatives, will become apparent to those of ordinary skill in the art by reading the following detailed description, with reference where appropriate to the accompanying figures.

DETAILED DESCRIPTION

Figure 1:
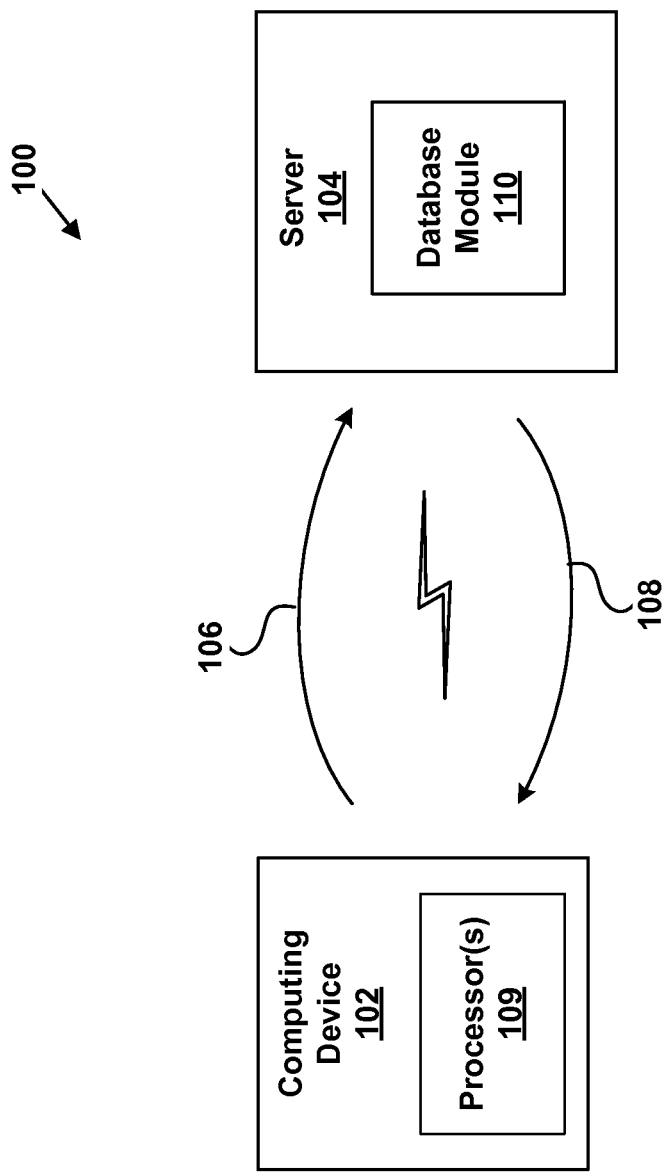
FIG. 1 illustrates an example communication system, in accordance with at least some embodiments described herein.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Where example embodiments involve information related to a person (e.g., a "user") or a device of a person, some embodiments may include privacy controls. Such privacy controls may include, at least, anonymization of device identifiers, transparency and user controls, including functionality that would enable users to modify or delete information relating to the user's use of a product.

Furthermore, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Applications may be configured to run on an operating system installed on a computing device. Such applications may also be configured to utilize various resources provided by the computing device in order to perform operations. For instance, a resource such as a camera may be used by a social media application in order to allow a user of the computing device to take a picture and upload that picture to their social media profile. In another instance, a resource such as a current Global Positioning System (GPS) location of the computing device may be used by a map application to calculate directions from the user's current location to a given destination. To enable an application's usage of a particular resource, at the application's request the computing device (or, more particularly, the operating system on the computing device) may at various times present the user with a permission request for the application to access the resource. For example, the computing device may present a permission request during an installation of the application. Additionally or alternatively, the computing device may present a permission request during a run-time of the application.

Within examples, the permission request may prompt the user to either allow the application to access the resource or deny the application access to the resource. In such examples, if the user selects to allow access, the application may be granted access to the resource for some or all subsequent run-times of the application, whereas if the user selects to deny access, the application may be denied access to the resource for some or all subsequent run-times of the application.

Within other examples, the permission request may prompt the user with three selectable options: a first option to allow the application to access the resource, a second option to deny the application access to the resource, and a third, "never ask again" option to prevent the application from requesting permission to access the resource. In these other examples, the second option to deny access, if selected, may not deny the application access for an extended period of time. Rather, the second option may have a more transient effect when selected. For instance, if the user selects the second option, the application may be denied access to the resource for only the current run-time of the application, and thus the computing device may prompt the user again at the subsequent run-time of the application. In these other examples, the third option may have a more permanent effect. For instance, if the user selects this third option, (i) the application may be prevented from requesting permission to access the resource at some or all subsequent run-times of the application, and (ii) the application may be denied access to the resource for some or all subsequent run-times of the application. In essence, by these selectable options, the application may be granted or denied permission to access the resource, or may be granted or denied permission to request permission to access the resource.

Provided herein are example systems and methods for controlling such permission requests for applications running on the computing device. At various times, such as an install time of a given application and/or one or more run-times of the application (e.g., the initial, first run-time or initial, first consecutive run-times of the application after the application is installed or reinstalled), the computing device may present the user with a first permission request that includes the first and second selectable options to either allow or deny access to a particular resource. In accordance with an example method, after receiving responses to the first permission request, the computing device may determine whether a number of responses to the first permission request that indicate to deny access exceeds a predefined threshold. Within examples, the predefined threshold may be a whole number that is greater than or equal to zero. If the computing device determines that the number exceeds the predefined threshold, the computing device may responsively present the user with a modified permission request that includes, in addition to the first and second selectable options, the third selectable option to prevent the application from requesting permission to access the particular resource. In particular, the computing device may present the user with this modified permission request at a run-time of the application subsequent to presentation of the first permission request based on the application attempting to access the particular resource.

Hereinafter, a user's selection of the first option to allow an application to access a particular resource may be referred to as a "yes" response, the user's selection of the second option to deny the application access to the particular resource may be referred to as a "no" response, and the user's selection of the third option to prevent requesting permission to access the particular resource may be referred to as a "never ask again" response. However, it should be understood that other terms can be used to describe such responses as well.

The computing device delaying presentation of the third option until after the computing device has received at least one "no" response in accordance with the disclosed methods and systems may provide various advantages to both the user and the developer of the application at issue. For instance, this may provide the developer of the application with at least one opportunity to (i) ask the user for permission to use the resource, (ii) present the user with an explanation of the purpose(s) for which the application will use the resource, and/or (iii) present the user with an explanation of why allowing the application to access the resource may improve user experience with the application, before the user has an opportunity to prevent permission requests for a specified or unspecified period of time. Furthermore, this may provide the user with an improved user experience with the application, in which the user is not repeatedly prompted with and interrupted by permission requests. Other advantages to the user and/or to the developer may exist as well.

Moreover, in practice, a developer of the application may be notified or otherwise detect when the first permission request has been modified to include the "never ask again" option, and then when the user has selected the "never ask again" option, may responsively configure the application to continue to present the user with permission requests or otherwise request the user to allow the application to access the resource. By way of example, the developer may configure the application to deny the user access to certain functionality of the application unless the user allows the application to access the resource. As another example, the developer may configure the application to present the user with instructions regarding how to change the permission settings for the application to allow access to the resource. A developer may implement these and other such configurations of the application for various reasons, such as if the developer perceives the "never ask again" response to have been selected by the user accidentally, instantaneously, and/or without the user's proper consideration of the first permission request. These and other such configurations may be less than desirable for the user, as they may have a negative impact on the user's experience with the application (e.g., permission requests, functionality changes, etc. may interrupt the application's run-time operations). Thus, it may be desirable in scenarios where the "never ask again" response was selected to configure the computing device to simulate a human user response, such as a response that indicates to the developer that the user carefully considered whether to allow access, deny access, or prevent subsequent requesting before making a selection.

Accordingly, within examples of the disclosed systems and methods, the computing device may be configured such that when the user has selected the third option, the computing device may transmit to the developer of the application at issue (e.g., to a server managed by the developer) a more generalized response message that indicates to the developer that a "no" response was selected, rather than a "never ask again" response. Further, because some developers may be able to determine how much time passes between when a given permission request is presented to the user and when the user responds to the given permission request, it may be desirable for the computing device to transmit the generalized response at a predefined time after the user selects the third option. By configuring the computing device to delay the developer's receipt of the generalized response in this manner, the developer may perceive that the user waited the predefined time before responding to the permission request with a "no" response.

Referring now to the figures, FIG. 1 illustrates an example communication system 100, in accordance with at least some embodiments described herein. The system 100 includes a computing device 102 that may communicate with a server 104 via one or more wired and/or wireless interfaces. The computing device 102 and the server 104 may communicate within a network. Alternatively, the computing device 102 and the server 104 may each reside within a respective network. Communication links between the computing device 102, server 104, and other devices (not shown) that may reside within the network(s) may include wired connections, such as a serial or parallel bus. Communication links may also be wireless links, which may include short range wireless links, IEEE 802.11 (IEEE 802.11 may refer to IEEE 802.11-2007, IEEE 802.11n-2009, or any other IEEE 802.11 revision), or other wireless based communication links.

The computing device 102 may be any type of computing device or plurality of cohesive computing devices including a personal computer, a laptop computer, a mobile telephone (e.g., a smartphone), or tablet computing device, etc., that is configured to transmit data 106 to, or receive data 108 from the server 104 in accordance with the operations described herein. The computing device 102 may include a user interface, a communication interface (e.g., a wireless Internet receiver, radio antenna, etc.), at least one processor 109, and data storage comprising instructions executable by the at least one processor for carrying out one or more operations. The user interface may include a graphical user interface (GUI) which may be implemented alternatively to or in conjunction with one or more of a touchscreen, buttons, a microphone, a web-based user interface, a gesture interface (e.g., mouse or hand gestures), a speaker, a voice user interface, a zooming user interface, other display(s), and/or any other elements for receiving inputs or communicating outputs. The computing device 102 may also include various other components as well. Within examples, the computing device may include a GPS sensor, magnetometer, sound meter, photodetector, accelerometer, and/or camera.

The server 104 may be any entity or computing device arranged to carry out the method and computing device operations described herein. Server 104 may include the same components as computing device 102. Further, the server 104 may be configured to send data 108 to or receive data 106 from the computing device 102. The server 104 may have a database module 110 configured to receive data from multiple computing devices, to aggregate and store the data, and to provide for display the data in various forms. The database module 110 may include information regarding applications that are configured for use on the computing device 102. Within examples, the server 104 may be associated with a developer of one or more applications that are configured for use on the computing device. Within other examples, the server 104 may be associated with another entity or entities.

The data 106 received by the server 104 from the computing device 102 may take various forms. For example, the computing device 102 may provide data 106 regarding whether certain applications are installed on the computing device 102. The computing device 102 may also provide data 106 about sensory data collected by a sensor of the computing device 102. For example, computing device 102 may provide data 106 to server 104 that indicates that a certain amount of sensory data collected by a sensor of computing device 102 may be audio or visual content. Data 106 may indicate that the sensory data may have been collected by the wireless internet receiver, radio antenna, GPS sensor, magnetometer, microphone, sound meter, photodetector, accelerometer, or camera. The server 104 may then store and aggregate the data for display or for other uses.

Within examples, the computing device 102 may store in memory of the computing device and/or provide to the server 104 data 106 associated to permission requests. Within examples, such data may be indicative of how many permission requests have been presented on the computing device (including, but not limited to, the "first permission request" and "modified permission request" discussed above), when each permission request was presented on the computing device, which selectable options were included in each permission request (e.g., yes, no, never ask again), how many of each type of response was received for the permission requests, when each response was received, and/or how much time elapsed between when a particular permission request was presented and when the response to the particular permission request was received. Other examples are possible as well.

The data 108 sent to the computing device 102 from the server 104 may take various forms. For example, the server 104 may send to the computing device 102 data 108 indicative of applications that are configured to use the sensory data collected by a sensor of computing device 102. As another example, the server 104 may send to the computing device 102 data 108 that, upon receipt by the computing device, may trigger the computing device (e.g., an operating system and/or application(s) on the computing device) to perform operations. Other examples are possible as well.

Figure 2:
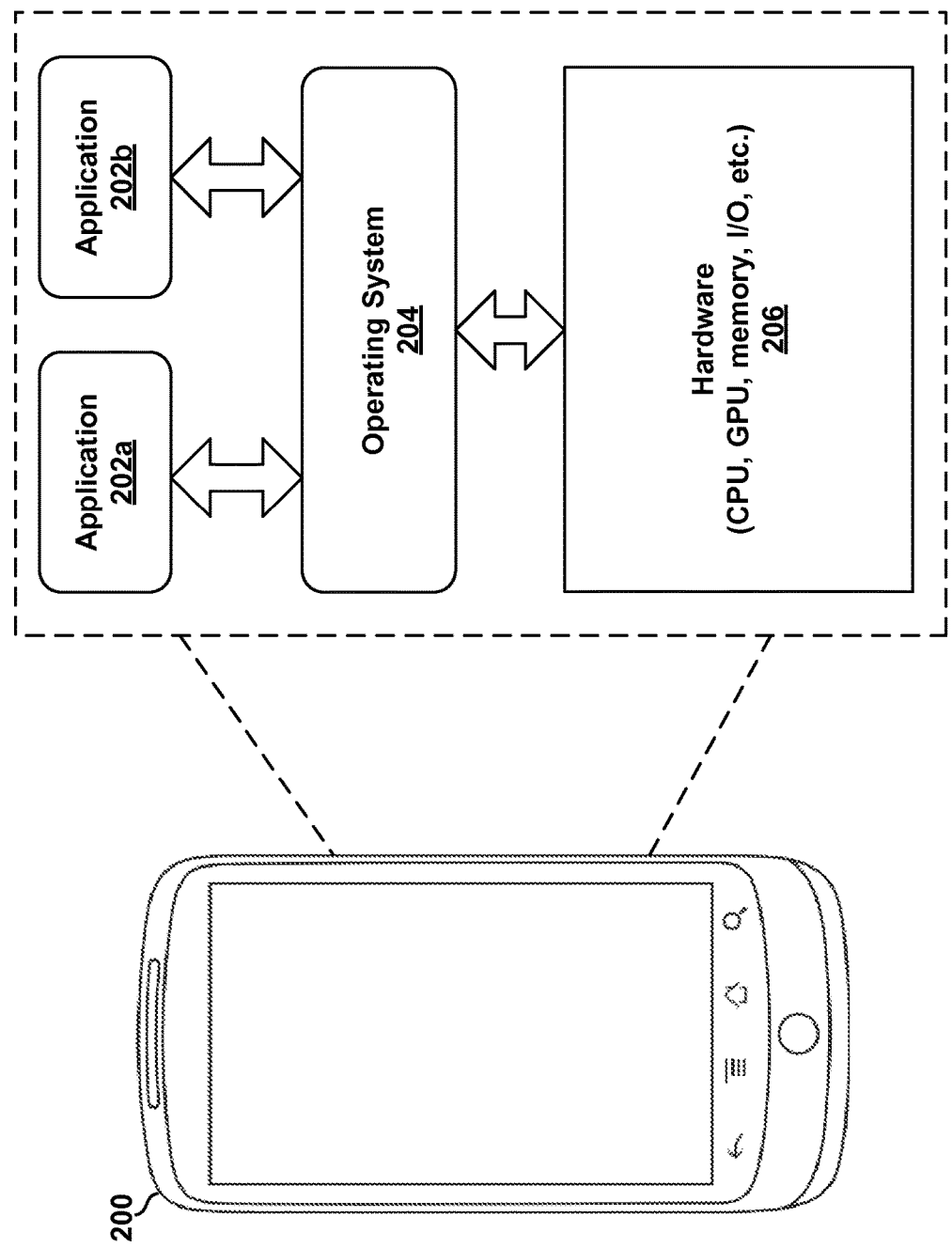
FIG. 2 illustrates an example computing device, in accordance with at least some embodiments described herein.

FIG. 2 illustrates an example computing device, in accordance with at least some embodiments described herein. The computing device 200 may include applications 202a and 202b and an operating system 204 being executed by hardware 206. The hardware 206 may further include one or more of the components noted above (e.g., camera, GPS sensor, speaker, etc.) and/or other components. Although the example computing device 200 is a smartphone, aspects of this disclosure are applicable to other computing devices such as desktop computers, laptops, tablet computers, etc. Further, computing device 200 may be identical or similar to computing device 102 shown in FIG. 1.

Each of the applications 202a and 202b may include instructions that when executed cause the computing device 200 to perform specific tasks or operations. The applications 202a and 202b may be native applications (i.e., installed by a manufacturer of the computing device 200 and/or a manufacturer of the operating system 204) or may be a third-party applications associated with various developers and installed by a user of the computing device 200 after purchasing the computing device. The applications 202a and 202b may be configured to use sensory data collected by sensor(s) and provided by the CPU. A non-exhaustive list of example applications includes: a media player application that accepts media files as inputs and generates corresponding video and/or audio to the output device(s); a social media application to which the user can upload text data, media content (e.g., photos, videos, etc.), and the like; an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a voice recording application, a media identifier application, a voice transcription application, a bookmarking application, and a word processing, spreadsheet, and/or presentation application that accepts specifically formatted files as inputs and presents them via the output devices for viewing and/or editing.

The operating system 204 may interact with and manage the hardware 206 to provide services for the applications 202a and 202b. For example, an application 202a may request that the operating system 204 direct an integrated camera of hardware 206 to capture a visual image and that the hardware 206 store the image to memory. The operating system 204 may be executed by a CPU.

The hardware 206 may include, for example, a central processing unit (CPU), a graphics processor (GPU), memory, an input/output (I/O) interface, user input device(s), and output device(s). The hardware 206 may also include speaker(s) and sensor(s). Components of hardware 206 may be controlled by instructions included in applications 202a and 202b and operating system 204.

The central processing unit (CPU) may, for example, comprise a single or multi-core processor, an application specific integrated circuit (ASIC), field programmable gate array (FPGA), and/or any other suitable circuitry. The CPU may be operable to effectuate the operation of the computing device 200 by executing program instructions (e.g., compiled or non-compiled program logic and/or machine code) stored in memory or disk storage. Such instructions may include the operating system 204 and the applications 202a and 202b. The CPU executing the instructions may cause sensory data to be written to or deleted from memory. The CPU may also receive sensory data from memory, sensory data from sensor(s), and input data from an input/output interface. The CPU may also provide output data to an input/output interface.

The graphics processor may be operable to generate a video stream for output to a screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other memory. Program memory may store instructions executable by the CPU to effectuate operation of the operating system 204 and the applications 202a and 202b. Runtime memory may store data generated or used during execution of the operating system 204 or applications 202a and 202b.

The input/output (I/O) interface may be operable to receive signals from input device(s), and provide corresponding signals to the CPU and/or the graphics processor. The input device(s) may be coupled to at least one processor of the computing device 200 and may include, for example, a mouse, one or more sensors configured to detect a gesture or touch response (e.g., a touchscreen or touchpad), one or more transducers configured to receive an audio response (e.g., a voice command from a user), a motion sensor, a trackball, a voice recognition device, a keyboard, or any other suitable input device which enables a user to interact with the computing device 200. Within examples, the data indicative of responses to one or more of the types of permission requests described herein may be received by at least one processor of the computing device 200 from the input device(s).

The output device(s) may be coupled to at least one processor of the computing device 200 and may include, for example, a display screen and at least one transducer configured to generate audio (e.g., speakers). The screen may be, for example, a liquid crystal display (LCD) screen, an OLED screen, an e-ink screen, and/or any other suitable device for presenting a graphical user interface. Within examples, one or more of the types of permission requests described herein may be provided by at least one processor via the output device(s). For instance, such request(s) may be provided as an audio request generated by at least one transducer. Additionally or alternatively, such request(s) may be provided as a visual request presented by a display.

Figure 3:
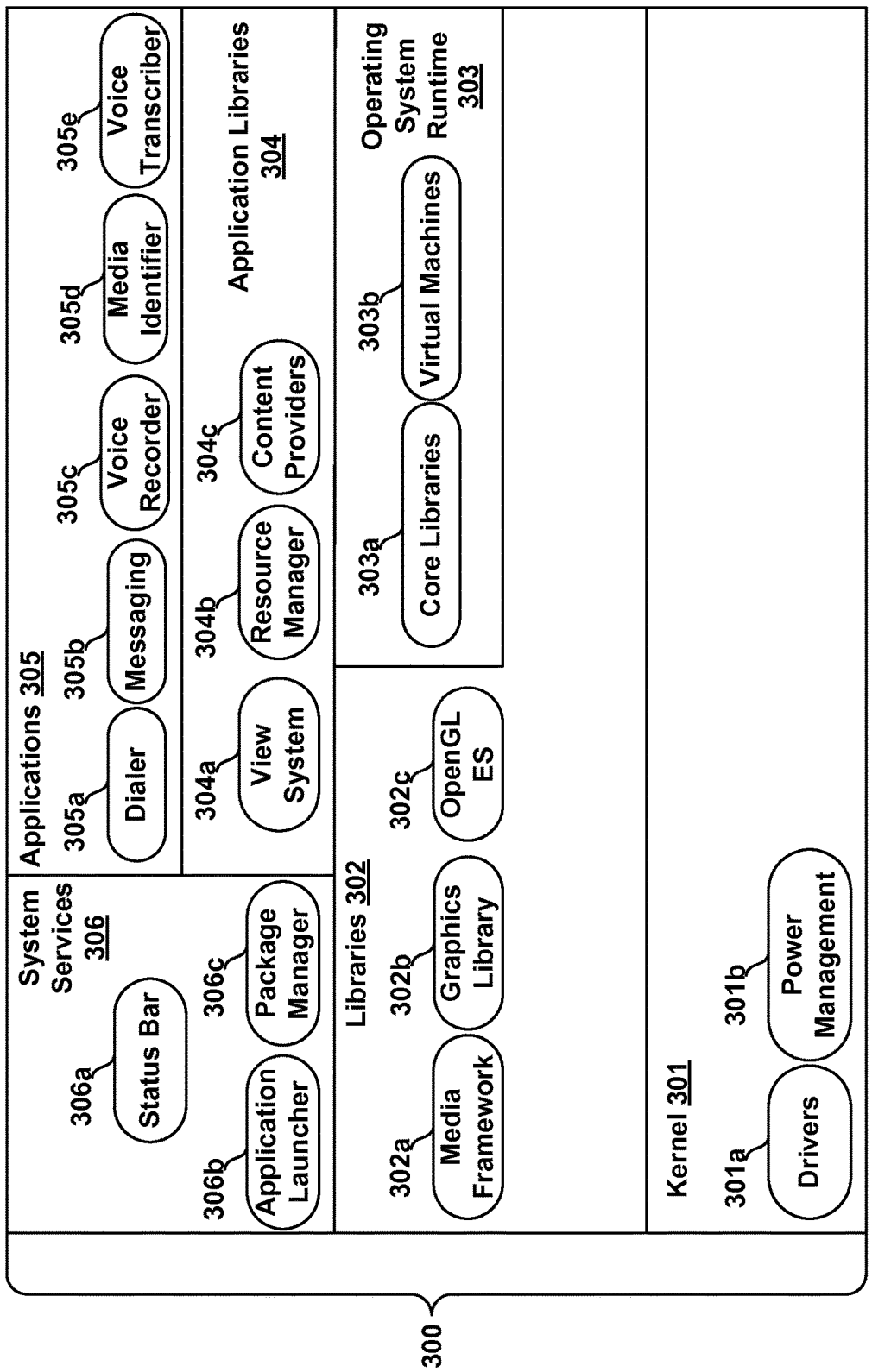
FIG. 3 is a block diagram illustrating example components of an operating system used by a computing device.

FIG. 3 is a block diagram illustrating example components of an operating system 300 used by a computing device. The operating system 300 may invoke multiple applications, while ensuring that an associated phone application is responsive and that wayward applications do not cause a fault of the operating system 300. Using task switching, the operating system 300 may allow for the switching of applications while on a telephone call, without losing the state of each associated application. The operating system 300 may use an application framework to enable reuse of components, and provide a scalable experience by combining pointing device and keyboard inputs and by allowing for pivoting. The operating system 300 may generally be organized into components including a kernel 301, libraries 302, an operating system runtime 303, application libraries 304, applications 305, and system services 306.

The kernel 301 may include drivers 301a that enable software such as the operating system 300 and applications 305 to interact with input/output devices. The kernel 301 may also include power management processes 301b that coordinate hardware power usage and provide alerts when an integrated battery is running low on power, for example.

The libraries 302 may include several subcomponents, such as media framework 302a, graphics library 302b, and OpenGL ES 302c. The media framework 302a may include functionality that supports standard video, audio and still-frame formats. The graphics library 302b may support two-dimensional application drawing. The OpenGL ES 302c may support gaming and three-dimensional graphics rendering.

The operating system runtime 303 may include core libraries 303a and virtual machines 303b. The virtual machines 303b may be custom virtual machines that run a customized file format. The virtual machines 303b may be used with an embedded environment since the virtual machines 303b use runtime memory efficiently, implement a CPU optimized bytecode interpreter, and support multiple virtual machine processes per device.

The application libraries 304 may include libraries for view system 304a, resource manager 304b, and content providers 304c. These application libraries may provide support for applications 305.

The applications 305 may include any number of applications, such as dialer 305a, messaging 305b, voice recorder 305c, media identifier 305d, and voice transcriber 305e. The dialer 305a may provide functionality related to placing or receiving phone calls. The messaging 305b may provide functionality related to receiving and sending messages, such as email, voice mail, or text messages. The voice recorder 305c may provide functionality related to sensing ambient sound waves and converting the sound waves into electronic data. The media identifier 305d may provide functionality related to determining the source of audio data. For example, if the audio data represents a musical recording, media identifier 305d may access a database to determine the artist(s) who composed the recording and when the recording was recorded. The voice transcriber 305e may provide functionality related to sensing ambient sound waves and converting the sound waves into data representing text. For example, the voice transcriber 305e may be provided an input representing audible speech and may produce output data representing an English transcription of the audible speech. The voice transcriber 305e may be configured to produce outputs in many languages.

The system services 306 may include status bar 306a, application launcher 306b, and package manager 306c. The status bar 306a may provide functionality related to providing system notifications. The application launcher 306b may provide functionality related to organization and execution of applications 305. The package manager 306c may maintain information for installed applications 305.

Figure 4:
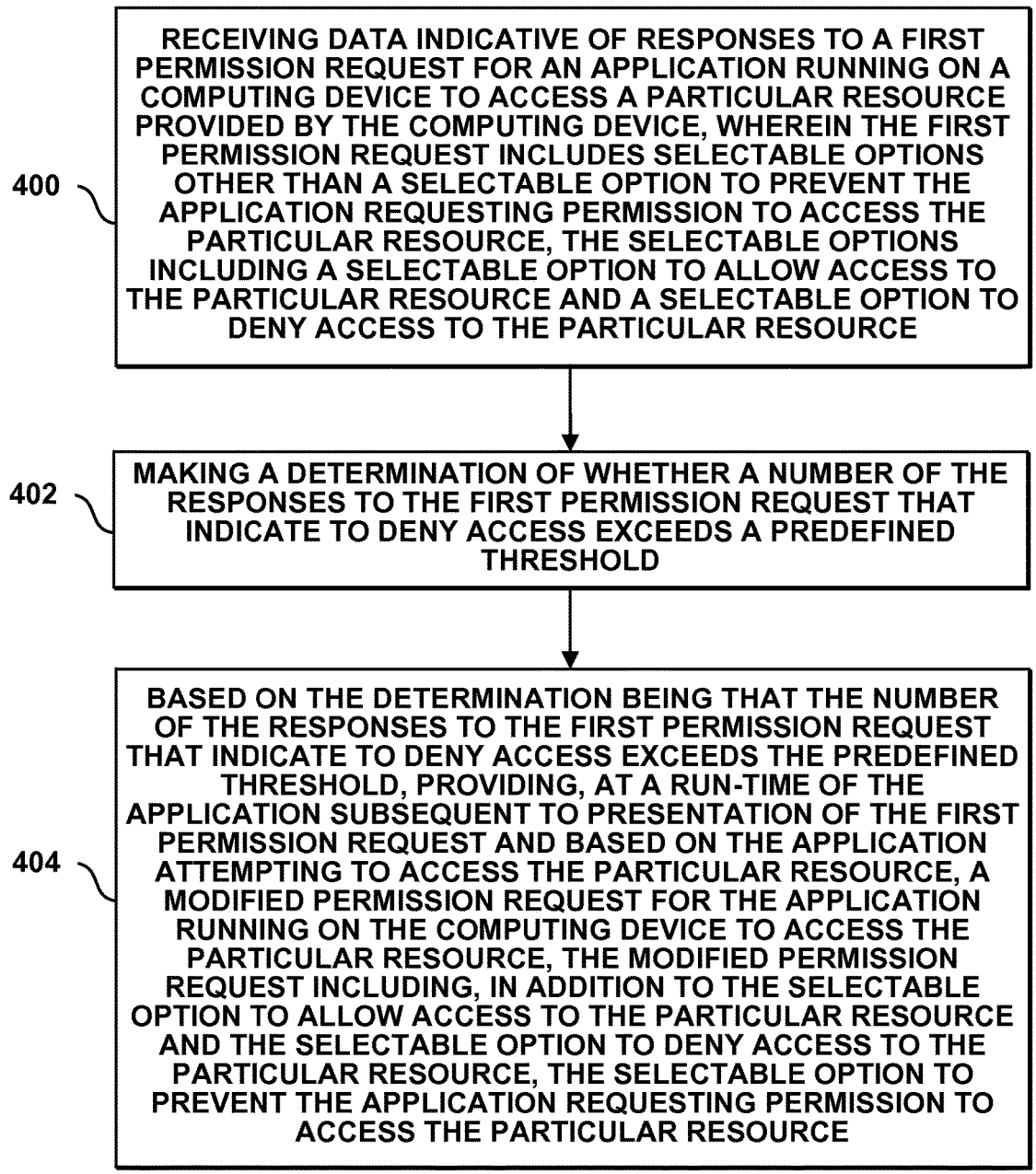
FIG. 4 is a flow chart for an example method, in accordance with at least some embodiments described herein.

FIG. 4 is a flow chart of an example method for controlling permission requests for applications configured to run on a computing device, in accordance with at least some embodiments described herein. The example method may include one or more operations or actions as illustrated by one or more of blocks 400-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the example method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the example method and other processes and methods disclosed herein, each block in FIG. 4 may represent circuitry that is wired to perform the specific logical functions in the process.

Illustrative methods, such as the method shown in FIG. 4, may be carried out in whole or in part by a component or components in a computing device and/or the cloud, such as by the one or more of the components of the computing device 102 shown in FIG. 1, or by the one or more of the components of the computing device 200 shown in FIG. 2. For instance, the method shown in FIG. 4 may be performed in whole or in part by at least one processor of a computing device on which one or more applications are installed and running. Further, the method shown in FIG. 4 may be performed in whole or in part by an operating system (e.g., operating system 204 and/or operating system 300) installed in memory on a computing device, with respect to one or more applications that are installed in the memory on the computing device. Still further, the operating system may perform aspects of the method using other components of the computing device, such as at least one processor of the computing device.

However, it should be understood that example methods may be carried out by other entities or combinations of entities (i.e., by other computing devices and/or combinations of computing devices). For example, operations of the example method shown in FIG. 4 may be fully performed by a computing device (or components of a computing device such as one or more processors), or may be distributed across multiple components of the computing device, across multiple computing devices, and/or across a server.

At block 400, the method includes receiving data indicative of responses to a first permission request for an application running on a computing device to access a particular resource provided by the computing device, where the first permission request includes selectable options other than a selectable option to prevent the application requesting permission to access the particular resource, the selectable options including a selectable option to allow access to the particular resource and a selectable option to deny access to the particular resource. The application may be a map application, social media application, or another type of application described herein or not described herein.

Within examples, the resource at issue may be a resource that is accessible by the at least one processor at or before the first permission request is presented, such as a resource that is stored locally in memory of the computing device and/or stored in memory located remotely from the computing device and accessible by the computing device. Within other examples, the resource at issue may be a resource that the at least one processor does not yet have access to at the time the first permission request is presented, but may be determined or otherwise acquired by the computing device in response to a particular user input. For instance, if the first permission request is a request for the application to access the current location of the computing device, the current location may not yet be known and stored by the computing device, but may be determined if the user allows the application to access the current location.

Within other examples, the resource at issue may be a component of the computing device or a component of another computing device with which the computing device at issue is in communication. For instance, the resource may be a camera, GPS sensor, accelerometer, light sensor, temperature sensor, or any sensor of the computing device, etc. Additionally or alternatively, the resource at issue may be an application, such as the application at issue or another application running on the computing device or on another computing device. For instance, the resource may be an application associated with a particular component of the computing device, such as a camera application. In such examples, by allowing or denying access to such a resource, the user may allow or deny access to data that is accessible to and/or acquired by that resource. Additionally or alternatively, the resource at issue may take the form of data associated with the application or component at issue, or another application or component of the computing device or other computing device. For instance, the resource may be media content (e.g., audio, video) captured by the camera and stored in memory.

As discussed above, the computing device, the at least one processor, and/or the operating system at issue may present the user of the computing device with the first permission request at one or more times during an installation of the application and/or at one or more times during a run-time of the application. In a particular embodiment, for instance, the method may be performed exclusively at (e.g., over the course of) a plurality of run-times of the application and not performed at an install time of the application.

The computing device may present the user with the first permission request in various ways. For example, the computing device may provide the first permission request for display on the computing device, such as including a graphical element representative of the first permission request as part of a GUI. The user may then interact with the GUI, such as by selecting a selectable option via a touchscreen of the computing device. To facilitate this, the GUI may include one or more checkboxes, one or more radio buttons, one or more track bars, one or more drop down lists, or other graphical control element(s) associated to one or more of the selectable options of the first permission request. In such an example, the GUI with the first permission request may be presented during a run-time of the application, but could additionally or alternatively be presented outside of the run-time of the application, such as in an email message, text message, or on a website associated with the user's account or profile with the application.

As another example, the computing device may provide the first permission request in audible form using speakers or another audio-based output component of the computing device. In such an example, the user of the computing device may respond to or otherwise interact with the first permission request by providing spoken utterances recognizable by a voice-user interface (VUI) of the application via one or more components of the computing device, such as a microphone. Spoken utterances may take the form of, and be interpretable by the computing device as, a voice command to allow or deny access to the resource, or a voice command to perform another operation that the computing device, application, and/or operating system is configured to perform.

Within examples, the first selectable option of the two selectable options may be an option to allow the application to access the particular resource for a predefined period of time. Within additional examples, the second selectable option of the two selectable options may be an option to deny the application access to the particular resource for a predefined period of time. In these examples, or in other examples discussed herein involving a predefined period of time, the predefined period of time may be seconds, minutes, hours, days, weeks, months, or years, in length, for instance. Additionally or alternatively, one or more predefined periods of time discussed herein may be dependent on a status of the application or other parameter associated with the application. For instance, a predefined period of time may expire (i) once a predefined number of consecutive or non-consecutive run-times of the applications have occurred, (ii) once a predefined number of updates have been downloaded or installed for the application, (iii) once a total run-time for the application has exceeded a particular threshold (e.g., the user has had the application "opened" and running on the computing device for a total of five hours), (iv) once a number of "yes" responses to the first permission request has exceed a predefined threshold, (v) once a number of "no" responses to the first permission request has exceeded a predefined threshold, (vi) at some point during an uninstallation process of the application, (vii) at some point during a reinstallation process of the application (after an uninstallation), and/or (viii) at some point during an update download or installation for the application. Such a predefined period of time may be based on other factors as well.

In addition to the first and second selectable options, the first permission request may include additional elements. For example, the first permission request may include one or more dialogs, such as (i) dialogs indicating that permission is being requested for the application to access the resource at issue, (ii) dialogs indicating reasons why permission is being requested for the application to access the resource (e.g., explaining what the application will do with the resource and why allowance of access to the application may be beneficial for the user), (iii) dialogs indicating privacy information (e.g., a privacy policy for the application), (iv) dialogs explaining how a selection of the first option will result in allowance of access to the resource, (v) intermediate questions presented to the user, perhaps with selectable options to answer the questions, in order to guide the user to an informed understanding of whether the user would like to allow or deny access to the resource, and/or (vi) dialogs explaining how a selection of the second option will result in denial of access to the resource, among other possibilities. Within examples in which one or more selectable options are included as part of the first permission request in addition to the first and second options, that permission request may include dialogs related to the additional selectable option(s), such as dialogs similar to those discussed above. As another example, the first permission request may include a link to a website, where the website comprises one or more of the dialogs listed above. As still another example, the first permission request may include a link to another application running on the computing device, such as a link to an application associated to the particular resource that the application at issue is seeking to access.

Figure 5:
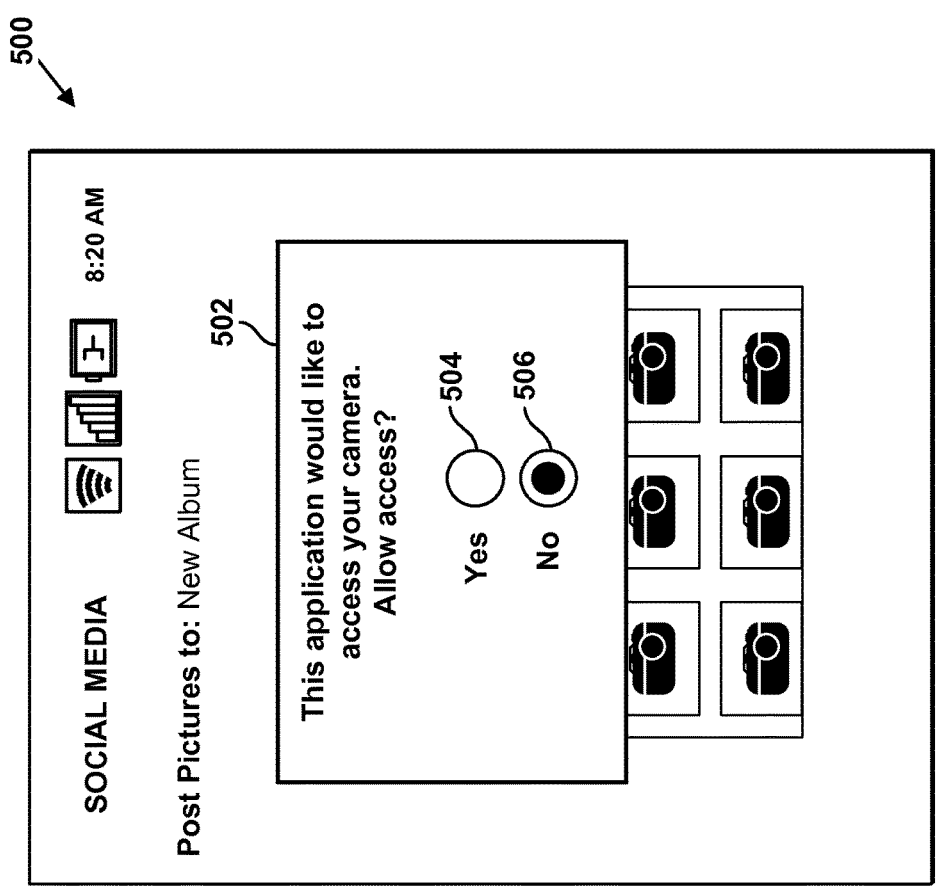
FIG. 5 illustrates an example graphical user interface, in accordance with at least some embodiments described herein.

FIG. 5 illustrates an example GUI 500, in accordance with at least some embodiments described herein. In particular, the example GUI 500 is a GUI for a social media application that is running on the computing device. As shown, the computing device displays, as a graphical element of the GUI 500, a permission request 502 that includes a dialog explaining that the social media application would like to access a camera of the computing device. The permission request 502 also includes a first selectable option 504 to allow access and a second selectable option 506 to deny access. Each of the selectable options is presented as radio buttons, so that the user may only select one of the two options. As shown, the user has selected the second option to deny the social media application access to the camera.

Referring back to FIG. 4, at block 402, the method includes making a determination of whether a number of the responses to the first permission request that indicate to deny access (i.e., "no" responses) exceeds a predefined threshold. As noted above, this predefined threshold may be a whole number greater than or equal to zero.

To facilitate determining whether the number of "no" responses to the first permission request exceeds the predefined threshold, and to facilitate performance of other aspects and variations of the methods described herein, the at least one processor may maintain, in the memory of the computing device (or in memory located remotely from the computing device), for each respective application that is installed in the memory of the computing device, a variety of data associated with the respective application. Within examples, this data may include, with respect to a particular application, (i) respective times at which the first permission request is presented to the user, (ii) what type of response is received each time the first permission request is presented, (iii) a first counter indicating the number of "no" responses received by the computing device, (iv) a first set of time data indicating respective times at which the number of "no" responses were received, (v) a second counter indicating a number of "yes" responses received by the computing device, and (vi) a second set of time data indicating respective times at which the number of "yes" responses were received.

Figure 6:
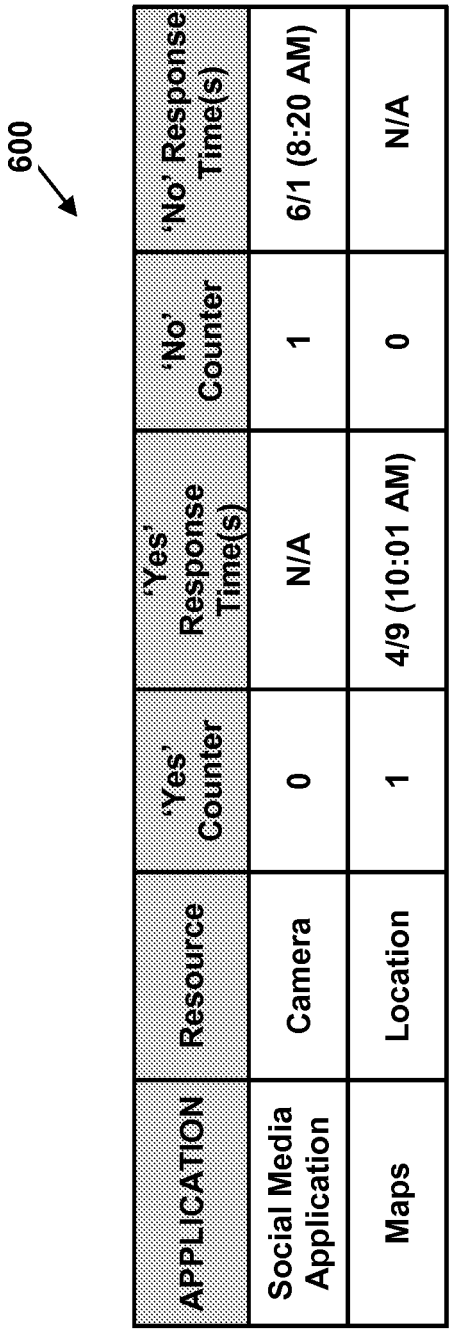
FIG. 6 illustrates an example table of data stored in memory at a computing device, in accordance with at least some embodiments described herein.

FIG. 6 illustrates an example table of data 600 stored in memory at the computing device, in accordance with at least some embodiments described herein. Six columns/fields are shown, each noted from leftmost to rightmost as "APPLICATION," "Resource," "'Yes' Counter," "'Yes' Response Time(s)," "'No' Counter," and "'No' Response Time(s)." The table 600 includes respective data associated with each of two different applications: the social media application shown in FIG. 5, and a map application. The resource that the social media application would like to access is the camera of the computing device and the resource that the maps application would like to access is the location of the computing device.

The table 600 of FIG. 6 represents a scenario in which the user has not selected a "yes" response to the permission request for the social media application, but as shown in FIG. 5, the user has selected one "no" response to the permission request for the social media application, and made that selection at 8:20 AM on June 1. The table 600 further includes representative data for a map application running on the computing device that the at least one processor may be maintaining in memory as well. As shown, the user selected a "yes" response to the permission request for the map application at 10:01 AM on April 9, and has not yet selected a "no" response to the permission request for the map application. It should be noted that in other embodiments the table 600 may include other data associated with other applications installed in memory on the computing device.

Referring back to FIG. 4, at block 404, the method includes, based on the determination being that the number of the responses to the first permission request that indicate to deny access exceeds the predefined threshold, providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource. As noted above, the modified permission request may be provided by the operating system on behalf of the application, and may be provided in graphical format for display on the computing device (e.g., with radio buttons or checkboxes) and/or in an audible format, for instance.

In some scenarios, the user may alternate between "yes" and "no" responses to permission requests. For example, at the first run-time of the application (or, at the first install time of the application) the user may select a "no" response, at a later run-time the user may select a "yes" response, at an even later run-time the user may select a "no" response again, and so forth. As another example, throughout six consecutive run-times, the user's responses may be, in order: "no," "yes," "no," "no," "no," "yes." In these types of scenarios, it may be desirable to configure the at least one processor to utilize a predefined threshold that is greater than zero, such as a predefined threshold of two or three "no" responses. In this manner, the modified permission request will not be provided (e.g., the "never ask again" option will not be triggered) until it appears to a degree of threshold high certainty that the user does not desire to allow the application to access the resource overall, and thus, when the number of "no" responses exceeds the non-zero predefined threshold, this may indicate to the computing device that it is an acceptable time to present the "never ask again" option.

Alternatively, in these types of scenarios, it may be desirable for similar or different reasons to compare only consecutive "no" responses to the predefined threshold, and thus configure the at least one processor to provide the modified permission request only when the number of consecutive "no" responses exceeds the predefined threshold. Accordingly, in some embodiments, the at least one processor may make a determination of whether a number of consecutive "no" responses to the permission request exceeds the predefined threshold, and then modify the permission request based on the determination being that the number of consecutive "no" responses exceeds the predefined threshold. For example, if the predefined threshold is three, the "never ask again" option will not be presented to the user until the user makes a "no" response four times in a row.

The at least one processor may provide the modified permission request based on various factors, in addition to or alternative to the factor of whether the number of consecutive or non-consecutive "no" responses exceeds a predefined threshold. For instance, the at least one processor may determine whether the number of "no" responses to the first permission request were received within a predefined threshold period of time, and then responsively provide the modified permission request based on a determination that the number of "no" responses were received within the predefined threshold period of time. By way of example, the predefined threshold of "no" responses may be two "no" responses, and the predefined threshold period of time may be twenty four hours. In such an example, modification of the permission request may be triggered by a determination that the number of "no" responses received is greater than two and/or the number of "no" responses received (whether greater than two or not) were received within a period of twenty four hours. Other examples are possible as well.

In some embodiments, the operating system may include a settings menu associated to the application at issue, and perhaps associated to one or more other applications that are installed in memory of the computing device and arranged to operate on the operating system as well. The settings menu may be provided for display on the computing device to the user and serve as an alternate means for the user to control the application's access to resources. To facilitate this in practice, the settings menu may include settings menu selectable options to control permissions, such as two selectable options to either allow access to the resource or deny access to the resource, for instance. Further, it should be understood that, within example embodiments described herein, the computing device may provide the user with means to revoke, enable, etc. at any time any permissions that the user has granted or denied. In practice, this means may take the form of the settings menu and/or may take other forms as well.

Within examples, the at least one processor may receive data indicating that the user selected, in the settings menu, a selectable option to deny access to the resource at issue. As such, the determination of whether the number of "no" responses to the first permission request exceeds the predefined threshold may be based at least in part on a number of times the user has selected a "no" response via the settings menu. For instance, if the predefined threshold is two consecutive "no" responses, and the at least one processor receives two consecutive run-time "no" responses to the first permission request followed by (with no "yes" responses in between) a "no" response selected via the settings menu, the at least one processor may responsively determine that the number of consecutive "no" responses (three, in this particular example) exceeds the predefined threshold of two, and thus modify the first permission request to include the "never ask again" option.

In some embodiments, the third selectable option ("never ask again") may be an option to prevent requesting permission to access the resource for a predefined period of time, and thus, in response to the at least one processor receiving input data indicative of a selection of the third selectable option, the at least one processor may prevent the application from requesting permission to access the resource only for that predefined period of time. Further, the stored number/counter of "no" responses (and potentially the stored number/counter for "yes" responses) may be reset/overridden when the predefined period of time expires. Within examples, the predefined period of time during which permission requests are prevented for the application may expire based on one or more of the conditions described above being met (e.g., once a certain number of yes/no responses have been received, once a certain number of run-times have occurred, etc.). Within additional examples, the preventing may be maintained across updates to the application that are downloaded and installed, and the predefined period of time may expire only when the application at issue is uninstalled and then reinstalled. As such, in response to determining that the application has been reinstalled, the at least one processor may store in memory that the number of "no" responses to the first permission request is zero (i.e., reset the counter). Additionally or alternatively, the predefined period of time may expire when the user makes a permission request selection in the settings menu for the application (e.g., after the user has made a "never ask again" response, the user may override this by navigating to the settings menu and changing the setting to allow access to the application).

In some embodiments, other factors may be taken into consideration when the at least one processor determines when to provide the modified permission request and/or determines how long the predefined period of time for preventing requesting will last. Such factors may include how many times the user makes "yes" responses to the permission request (e.g., whether the number of "yes" responses received exceeds a predefined threshold), how frequently the user makes "yes" responses (e.g., whether the "yes" responses were received within a predefined period of time), and/or whether the number of "yes" responses received is greater than the number of "no" responses received (e.g., at least a threshold amount more "yes" responses than "no" responses).

In response to determining one or more of the factors noted above, the at least one processor may perform various actions. Within examples, the at least one processor may adjust the predefined threshold and thereby determine whether to provide the modified permission request based at least in part on the determination of whether the number of "no" responses received exceeds the adjusted predefined threshold. As a more particular example, if the user tends to make "yes" responses often, the user may be less likely to select the "never ask again" option if that option were to be presented, and thus the predefined threshold may be increased so that the "never ask again" option may be presented only when the user makes a larger quantity of "no" responses. Along these lines, when the number of "yes" responses is greater than the number of "no" responses, and before providing any sort of modified permission request, the at least one processor may determine an alternate permission request that includes only the two selectable options to allow or deny access to the resource, and then provide the determined alternate permission request instead of a modified permission request with the third selectable option. In this manner, as long as the user makes significantly more "yes" responses than "no" responses, the "never ask again" option may be disabled, such as in a scenario where the user does not want to be presented with the "never ask again" option or in a scenario where the user frequently makes "yes" responses but then accidentally makes a "no" response.

Furthermore, in response to determining that the number of "yes" responses is greater than the number of "no" responses, or perhaps in response to determining that the number of "yes" responses exceeds a predefined threshold, the at least one processor may determine the period of time during which requesting permission will be prevented when the third option is selected, and then prevent the application from requesting permission for the determined period of time when the third option is selected. For instance, the at least one processor may decrease the predefined period of time. By way of example, if the predefined period of time typically is set to expire when the application is uninstalled and then reinstalled, in response to determining that the user has made a threshold high number of "yes" responses, the predefined period of time may be reduced such that it expires when the application is next updated. Other examples are possible as well.

Moreover, within additional examples, in response to the at least one processor determining one or more of the conditions described above such as a threshold high number of "yes" responses, and further in response to it determining that the user has selected the "never ask again" option after having been presented with the modified permission request, it may ignore the user's selection of the "never ask again" option and wait until the user makes another "never ask again" response. This may account for a scenario in which the user typically makes "yes" responses any may have accidentally selected "never ask again" after having been presented with that option.

It should be understood that the at least one processor may take any of the actions described above based in whole or in part on how frequently the "yes" responses are received.

The at least one processor may include other modifications in the modified permission request as well, and may make such modifications based in whole or in part on one or more of the factors discussed above. Within examples, the modified permission request may include additional dialogs or revise previous dialogs included in the permission request. For instance, the modified permission request may include a dialog listing one or more reasons why the application is requesting permission to access the resource. Additionally or alternatively, the modified permission request may include a link to a website and/or a link to another application running on the computing device, among other possibilities.

For some examples, the at least one processor may also maintain in the memory of the computing device (or in memory located remotely from the computing device), for each respective application that is installed in the memory of the computing device, data associated with the modified permission request. Within examples, this data may include (i) time data indicating when the modified permission request is provided (e.g., when the operating system caused the "never ask again" option to be displayed), (ii) time data indicating when a response to the modified permission request is received by the computing device, (iii) data indicating what type of response is received (e.g., "yes," "no," or "never ask again"), and/or (iv) a third counter indicating a number of "never ask again" responses received by the computing device. In some scenarios, the computing device may provide the modified permission request at multiple run-times of the application subsequent to presentation of the first permission request based on the application attempting to access the resource at the run-times, such as if the user does not select the "never ask again" option and instead continues to select the "no" option.

Figure 7:
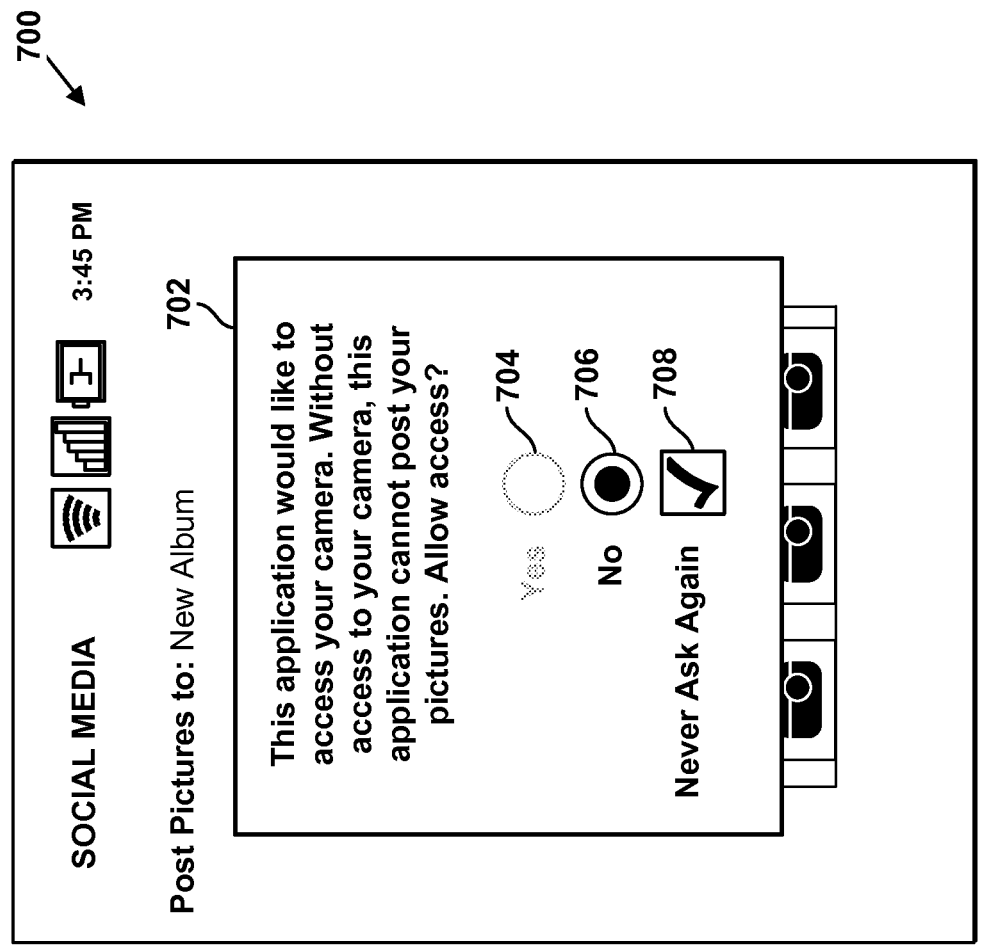
FIG. 7 illustrates another example graphical user interface, in accordance with at least some embodiments described herein.

FIG. 7 illustrates another example GUI 700, in accordance with at least some embodiments described herein. In particular, the example GUI 700 is another GUI for the social media application referred to in FIG. 5 and FIG. 6. As shown, the computing device provides for display as a graphical element of the GUI 700, the modified permission request 702 that includes a dialog explaining that the social media application would like to access the camera of the computing device. Further, the modified permission request 702 includes another dialog explaining a reason why the social media application is requesting permission to access the camera. Still further, the modified permission request 702 includes a first selectable option 704 to allow access, a second selectable option 706 to deny access, and a third selectable option 708 to prevent requesting access (i.e., "never ask again"). The first and second selectable options are presented as radio buttons to that the user may only select one of those two options, whereas the third selectable option 708 is presented as a checkbox. Upon the user's selection of the checkbox, the first selectable option 704 is disabled (e.g., greyed out, as shown) so that the user must either select the second selectable option 706 or uncheck the "never ask again" checkbox to re-enable the first selectable option. As shown, the user has checked the checkbox and selected the second selectable option 706. The combination of the user's selection of the second selectable option 706 while the third selectable option checkbox is checked will invoke the "never ask again" functionality, and the social media application will be prevented from requesting permission to access the camera.

It should be understood that in other embodiments, each of the selectable options may be presented in other manners. For example, each of the three selectable options may be presented as radio buttons, so that the user may only select one of the three options, and the user may thus select the third option in order to prevent the social media application from requesting permission to access the camera.

In some embodiments, the third selectable option may be an option to prevent the application at issue from requesting permission to access more than just the particular resource at issue. For example, if the application at issue is arranged to use a plurality of resources provided by the computing device, the third selectable option may be an option to prevent the application from requesting permission to access some or all of the plurality of resources. As a more specific example, if the operating system may, in certain scenarios, request permission on behalf of the social media application for the social media application to access a camera of the computing device and a GPS location of the computing device, the third selectable option may be an option to prevent the operating system from requesting, on behalf of the social media application, permission for the social media application to access both the camera and the GPS location. In other embodiments, the third selectable option may apply only to the resource at issue, but the modified permission request may further include other selectable options as well, such as at least a fourth selectable option to prevent requesting permission to access one or more other resources that the application at issue is arranged to use and that are provided by the computing device.

As discussed above, in practice, the developer of the application or other individual or organization associated with the application may be notified of or otherwise determine when the modified permission request has been provided, what selection the user made in response to the modified permission request, and/or when the user selected the user's response to the modified permission request. Thus, it may be desirable in scenarios where the "never ask again" response was selected to configure the computing device to simulate a human user response to the developer, such as to simulate that the user carefully considered their response to the modified permission request. Within examples, after the computing device has provided the "never ask again" option, and in response to the computing device receiving data indicating that the "never ask again" option has been selected, the computing device may transmit, to server(s) or other computing device(s) associated to the developer of the application, a default generalized response message. The default generalized response message may take various forms and include various types of information, some or all of which may serve to avoid indicating to the developer that the "never ask again" option was selected by the user. For instance, rather than indicate that the "never ask again" option was selected by the user, the default generalized response may instead indicate that the "no" option was selected by the user.

Within such examples, the computing device may further simulate human response by transmitting the default generalized response at a predefined time after receiving the selection of the "never ask again" response, such as five seconds, ten seconds, thirty seconds, or one minute after the user selects the "never ask again" response. Such a predefined time may be a default time used by the computing device, or may be determined by the computing device based on one or more of the factors discussed above (e.g., number of "yes" or "no" responses, times the "yes" or "no" responses were received, etc.).

Within other examples, however, a message transmitted to the developer in response to a selection of the "never ask again" response may not be a default generalized response message. Instead, the computing device may notify the developer that the "never ask again" response was selected by the user, but may transmit such a notification message to the developer with a delay.

Within additional examples, the computing device may notify the developer once the modified permission request is provided, additionally or alternatively to notifying the developer once the user has responded to the modified permission request. Within other examples, however, once the modified permission request is provided, the computing device may alternatively transmit to the developer a default generalized notification indicating that the modified permission request has not been provided.

Furthermore, these messages transmitted to the developer, such as the default generalized response message and/or other types of messages transmitted between the developer and the computing device, may include information identifying the user, the computing device, and/or the application, and may further include any or all of the data stored in memory of the computing device (e.g., counters, times, etc.).

As an illustrative example of the default generalized response message discussed above, there may be a scenario in which the modified permission request is provided with the "never ask again" option at a time of 1:00 PM, and the developer of the application at issue may be notified of this time. Within thirty seconds or less following 1:00 PM, the user may select the "never ask again" option. As such, the user's computing device may be configured to wait thirty more seconds and, at the end of that addition thirty seconds, transmit to a server associated to the developer, at a time of 1:01 PM, a default generalized response message indicating that the user selected the "no" option. Other examples are possible as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by at least one processor of a computing device, data indicative of responses to a first permission request for an application running on the computing device to access a particular resource on the computing device, wherein the particular resource is one or more of a hardware resource and a data resource, wherein the first permission request includes selectable options other than a selectable option to prevent the application requesting permission to access the particular resource, the selectable options including a selectable option to allow access to the particular resource and a selectable option to deny access to the particular resource;
   the at least one processor making a determination of whether a number of the responses to the first permission request that indicate to deny access exceeds a predefined threshold; and
   based on the determination being that the number of the responses to the first permission request that indicate to deny access exceeds the predefined threshold, the at least one processor providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource,
   wherein the application is one of a plurality of applications that are installed in a memory of the computing device accessible by the at least one processor,
   wherein the plurality of applications are arranged to operate on an operating system that is installed in the memory,
   wherein the at least one processor is configured to maintain, in the memory of the computing device, for each respective application of the plurality of applications, (i) a first counter indicating a number of responses to a permission request for the respective application to access the particular resource that indicate to deny access to the particular resource and (ii) a second counter indicating a number of responses to a permission request for the respective application to access the particular resource that indicate to allow access to the particular resource, and
   wherein the method is performed by the operating system, using the at least one processor, with respect to respective applications of the plurality of applications.

2. The method of claim 1, wherein making the determination of whether the number of the responses to the first permission request that indicate to deny access exceeds the predefined threshold comprises making a determination of whether a number of consecutive responses to the first permission request that indicate to deny access exceeds the predefined threshold, and
   wherein providing the modified permission request is based on the determination being that the number of consecutive responses that indicate to deny access exceeds the predefined threshold.

3. The method of claim 1, wherein the predefined threshold is zero.

4. The method of claim 1, further comprising:
   after providing the modified permission request, the at least one processor receiving data indicative of a selection of the selectable option to prevent the application requesting permission to access the particular resource; and
   in response to receiving the data indicative of the selection, the at least one processor preventing the application from requesting permission to access the particular resource for a predefined period of time.

5. The method of claim 1, wherein the method is performed at a plurality of run-times of the application and not performed at an install time of the application.

6. A computing device comprising:
   one or more processors; and
   a computer-readable medium having stored thereon program instructions that when executed by the one or more processors cause the computing device to perform operations comprising:
   receiving data indicative of responses to a first permission request for an application running on the computing device to access a particular resource on the computing device, wherein the particular resource is one or more of a hardware resource and a data resource, wherein the permission request includes selectable options other than a selectable option to prevent the application requesting permission to access the particular resource, the selectable options including a selectable option to allow access to the particular resource and a selectable option to deny access to the particular resource;
   making a determination of whether a number of the responses to the first permission request that indicate to deny access exceeds a predefined threshold; and
   based on the determination being that the number of the responses to the first permission request that indicate to deny access exceeds the predefined threshold, providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource,
   wherein the application is one of a plurality of applications that are installed in a memory of the computing device accessible by the at least one processor, wherein the plurality of applications are arranged to operate on an operating system that is installed in the memory, wherein the at least one processor is configured to maintain, in the memory of the computing device, for each respective application of the plurality of applications, (i) a first counter indicating a number of responses to a permission request for the respective application to access the particular resource that indicate to deny access to the particular resource and (ii) a second counter indicating a number of responses to a permission request for the respective application to access the particular resource that indicate to allow access to the particular resource, and wherein the method is performed by the operating system, using the at least one processor, with respect to respective applications of the plurality of applications.

7. The computing device of claim 6, further comprising an input coupled to at least one of the one or more processors and an output coupled to at least one of the one or more processors, wherein receiving the data indicative of the responses comprises receiving the data indicative of the responses from the input, and wherein providing the modified permission request comprises providing the modified permission request via the output.

8. The computing device of claim 7, wherein the output comprises at least one transducer generating an audio request.

9. The computing device of claim 7, wherein the input comprises at least one transducer receiving an audio response.

10. The computing device of claim 7, wherein the output comprises a display presenting a visual request.

11. The computing device of claim 7, wherein the input comprises a sensor detecting a gesture or touch response.

12. The computing device of claim 6, wherein the determination is a first determination, the operations further comprising:

making a second determination of whether the number of the responses to the first permission request that indicate to deny access were received within a predefined threshold period of time, and wherein providing the modified permission request is further based on the second determination being that the number of the responses to the first permission request that indicate to deny access were received within the predefined threshold period of time.

13. The computing device of claim 6, wherein the determination is a first determination, the operations further comprising:

before providing the modified permission request at the run-time of the application subsequent to presentation of the first permission request:

making a second determination of whether a number of the responses to the first permission request that indicate to allow access is greater than the number of the responses to the first permission request that indicate to deny access; and based on the second determination being that the number of the responses to the first permission request that indicate to allow access is greater than the number of the responses to the first permission request that indicate to deny access, determining an alternate permission request that includes only the selectable option to allow access to the particular resource and the selectable option to deny access to the particular resource, wherein providing the modified permission request comprises providing, as the modified permission request, the determined alternate permission request.

14. The computing device of claim 6, wherein the determination is a first determination, the operations further comprising:

before making the first determination of whether the number of the responses to the first permission request that indicate to deny access exceeds the predefined threshold:

making a second determination of whether a number of the responses to the first permission request that indicate to allow access is greater than the number of the responses to the first permission request that indicate to deny access; and based on the second determination being that the number of the responses to the first permission request that indicate to allow access is greater than the number of the responses to the first permission request that indicate to deny access, increasing the predefined threshold, wherein making the first determination of whether the number of the responses to the first permission request that indicate to deny access exceeds the predefined threshold comprises making the first determination of whether the number of the responses to the first permission request that indicate to deny access exceeds the increased predefined threshold.

15. The computing device of claim 6, wherein the application is arranged to operate on an operating system that is installed in a memory of the computing device, wherein the operating system includes a settings menu associated to the application, and wherein the settings menu includes the selectable option to allow access to the particular resource and the selectable option to deny access to the particular resource, the operations further comprising:

before making the determination of whether the number of the responses to the first permission request that indicate to deny access exceeds the predefined threshold:

providing the settings menu for display on the computing device; and receiving data indicative of a settings menu selection of the selectable option to deny access to the particular resource, wherein making the determination of whether the number of the responses to the first permission request that indicate to deny access exceeds the predefined threshold is based at least in part on the settings menu selection.

16. The computing device of claim 6, the operations further comprising:

after providing the modified permission request, receiving data indicative of a selection of the selectable option to prevent the application requesting permission to access the particular resource; and in response to receiving the data indicative of the selection, transmitting at a predefined time following receipt of the data indicative of the selection, to a server associated with a developer of the application, a default generalized response message indicating that a selection of the selectable option to deny access to the particular resource was made.

17. A non-transitory computer-readable medium having stored thereon program instructions that when executed by a computing device that includes at least one processor cause the computing device to perform operations comprising:
- receiving data indicative of responses to a first permission request for an application running on the computing device to access a particular resource on the computing device, wherein the particular resource is one or more of a hardware resource and a data resource, wherein the first permission request includes selectable options other than a selectable option to prevent the application requesting permission to access the particular resource, the selectable options including a selectable option to allow access to the particular resource and a selectable option to deny access to the particular resource;
- making a determination of whether a number of the responses to the first permission request that indicate to deny access exceeds a predefined threshold; and
- based on the determination being that the number of the responses to the first permission request that indicate to deny access exceeds the predefined threshold, providing, at a run-time of the application subsequent to presentation of the first permission request and based on the application attempting to access the particular resource, a modified permission request for the application running on the computing device to access the particular resource, the modified permission request including, in addition to the selectable option to allow access to the particular resource and the selectable option to deny access to the particular resource, the selectable option to prevent the application requesting permission to access the particular resource,
- wherein the application is one of a plurality of applications that are installed in a memory of the computing device accessible by the at least one processor,
- wherein the plurality of applications are arranged to operate on an operating system that is installed in the memory,
- wherein the at least one processor is configured to maintain, in the memory of the computing device, for each respective application of the plurality of applications, (i) a first counter indicating a number of responses to a permission request for the respective application to access the particular resource that indicate to deny access to the particular resource and (ii) a second counter indicating a number of responses to a permission request for the respective application to access the particular resource that indicate to allow access to the particular resource, and
- wherein the method is performed by the operating system, using the at least one processor, with respect to respective applications of the plurality of applications.

18. The non-transitory computer-readable medium of claim 17, the operations further comprising:
- maintaining, in a memory of the computing device, the number of the responses to the first permission request that indicate to deny access;
- determining that the application has been reinstalled; and
- in response to determining that the application has been reinstalled, storing in the memory that the number of the responses to the first permission request that indicate to deny access is zero.

19. The non-transitory computer-readable medium of claim 17, wherein the determination is a first determination, and wherein the predefined threshold is a first predefined threshold, the operations further comprising:
- after providing the modified permission request, receiving data indicative of a selection of the selectable option to prevent the application requesting permission to access the particular resource; and
- in response to receiving the data indicative of the selection, (i) making a second determination of whether a number of the responses to the first permission request that indicate to allow access exceeds a second predefined threshold, (ii) based on the determination being that the number of the responses to the first permission request that indicate to allow access exceeds the second predefined threshold, determining a period of time during which to prevent the application from requesting permission to access the particular resource, and (iii) preventing the application from requesting permission to access the particular resource for the determined period of time.

20. The non-transitory computer-readable medium of claim 17, wherein providing the modified permission request comprises providing the modified permission request for display on the computing device.

21. The non-transitory computer-readable medium of claim 17, wherein providing the modified permission request for display on the computing device comprises providing for display on the computing device a graphical user interface comprising one or more of: a respective checkbox associated to each selectable option of the modified permission request, and a respective radio button associated to each selectable option of the modified permission request.

22. The non-transitory computer-readable medium of claim 17, the operations further comprising:
- in response to the determination being that the number of the responses to the first permission request that indicate to deny access exceeds the predefined threshold, providing for display, at the run-time of the application subsequent to the presentation of the first permission request, a dialog including a reason why the application running on the computing device is requesting permission to access the particular resource.

* * * * *